(12) United States Patent
Hirose et al.

(10) Patent No.: US 8,077,771 B2
(45) Date of Patent: Dec. 13, 2011

(54) MOVING-IMAGE DISTRIBUTING APPARATUS, MOVING-IMAGE DISTRIBUTING SYSTEM, AND COMPUTER PRODUCT

(75) Inventors: Tomonori Hirose, Kawasaki (JP); Atsushi Taya, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 1631 days.

(21) Appl. No.: 11/410,814

(22) Filed: Apr. 26, 2006

(65) Prior Publication Data
US 2006/0193381 A1    Aug. 31, 2006

Related U.S. Application Data

(63) Continuation of application No. PCT/JP03/13992, filed on Oct. 31, 2003.

(51) Int. Cl.
  H04N 7/12       (2006.01)
  H04N 7/173      (2011.01)
(52) U.S. Cl. .................. 375/240.01; 725/119
(58) Field of Classification Search .............. None
  See application file for complete search history.

(56) References Cited

U.S. PATENT DOCUMENTS
2004/0028391 A1 *    2/2004   Black et al. ............... 386/108

FOREIGN PATENT DOCUMENTS

| JP | 6-214962 | 8/1994 |
|---|---|---|
| JP | 9-326873 | 12/1997 |
| JP | 2003-134045 | 5/2003 |
| JP | 2003-204297 A | 7/2003 |
| JP | 2003-274383 A | 9/2003 |
| JP | 2003-274390 | 9/2003 |
| JP | 2003-274390 A | 9/2003 |

OTHER PUBLICATIONS

Chinese Office Action issued on Apr. 15, 2009 in corresponding Chinese Patent Application 2005-510139.
Japanese Office Action issued on Apr. 15, 2009 in corresponding Japanese Patent Application 2005-510139.

* cited by examiner

*Primary Examiner* — Jayanti K Patel
*Assistant Examiner* — Richard Torrente
(74) *Attorney, Agent, or Firm* — Staas & Halsey LLP

(57) ABSTRACT

A moving-image-data acquiring unit acquires, when a failure occurs in other moving-image distributing apparatus, a plurality of moving-image data transmitted from a part of the encoders to the other moving-image distributing apparatus. An imaging-target-information acquiring unit acquires location information of an imaging target from a management server that manages the location information of the imaging target. An encoder selecting unit selects the encoder to take charge in place of the other moving-image distributing apparatus, based on encoder location information included in the moving-image data and the location information of the imaging target.

10 Claims, 14 Drawing Sheets

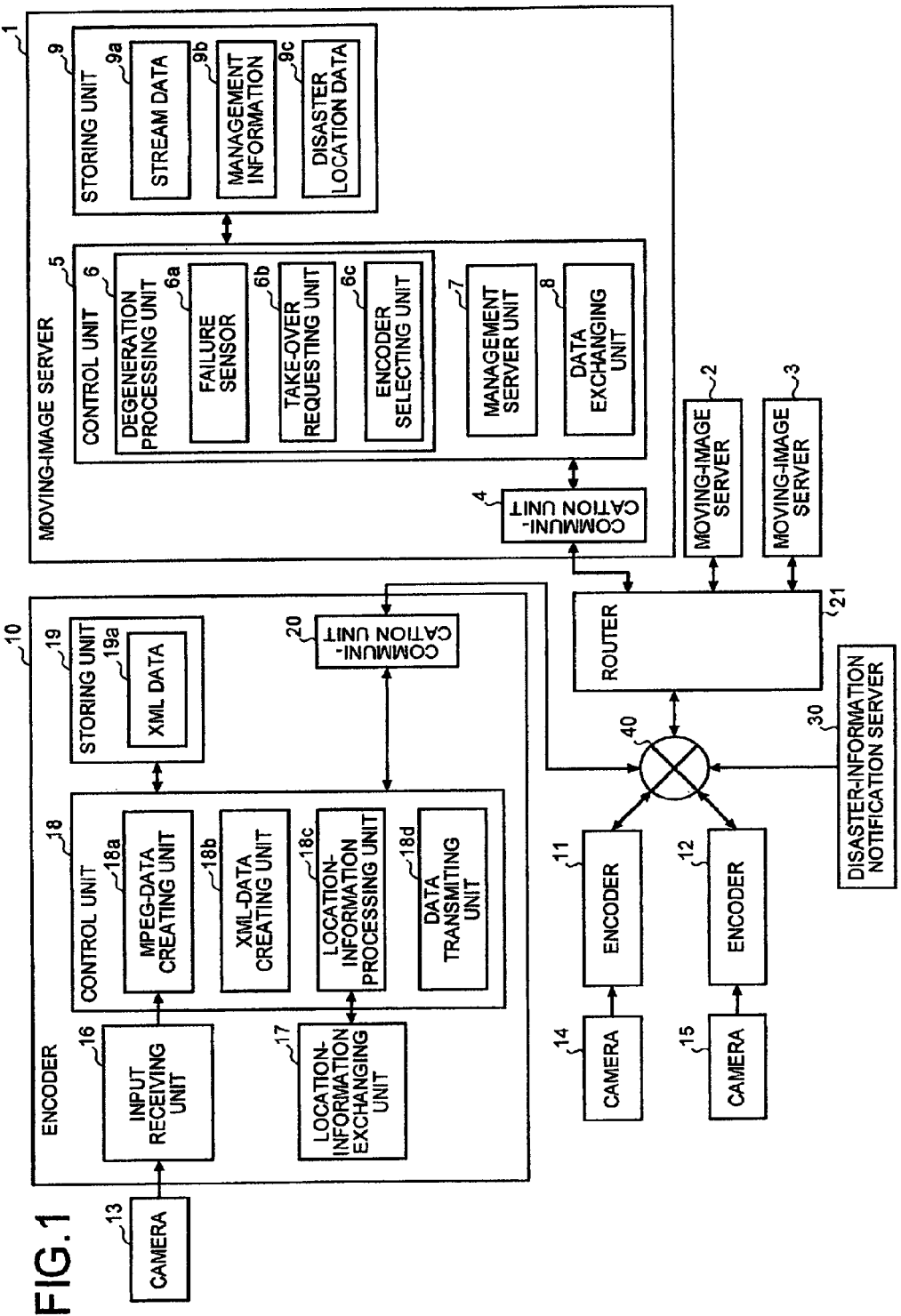

FIG.2

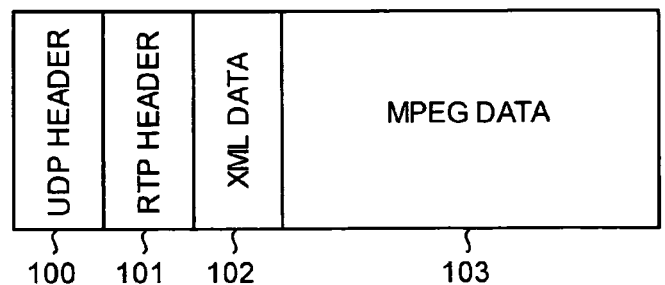

| UDP HEADER | RTP HEADER | XML DATA | MPEG DATA |

```
-->
<DescriptionMetadata>
 <Role href="urn:fujitsu:tbd">
  <Name>STREAM DISTRIBUTING APPARATUS</Name>
 </Role>
 <Creator>
  <Instrument>
   <Tool><Name>Fujitsu IP-700</Name></Tool>
   <Setting name="GroupID" Value="001"/>
  </Instrument>
 </Creator>
 <CreationLocation>          LONGITUDE    LATITUDE    DIRECTION OF CAMERA
  <GeographicPosition>
   <Point longitude="135.75" latitude="35.5" altitude="100" />
  </GeographicPosition>
 </CreationLocation>
 <CreationTime>2001-09-10T12:10:25</CreationTime>
</DescriptionMetadata>
<!--
```

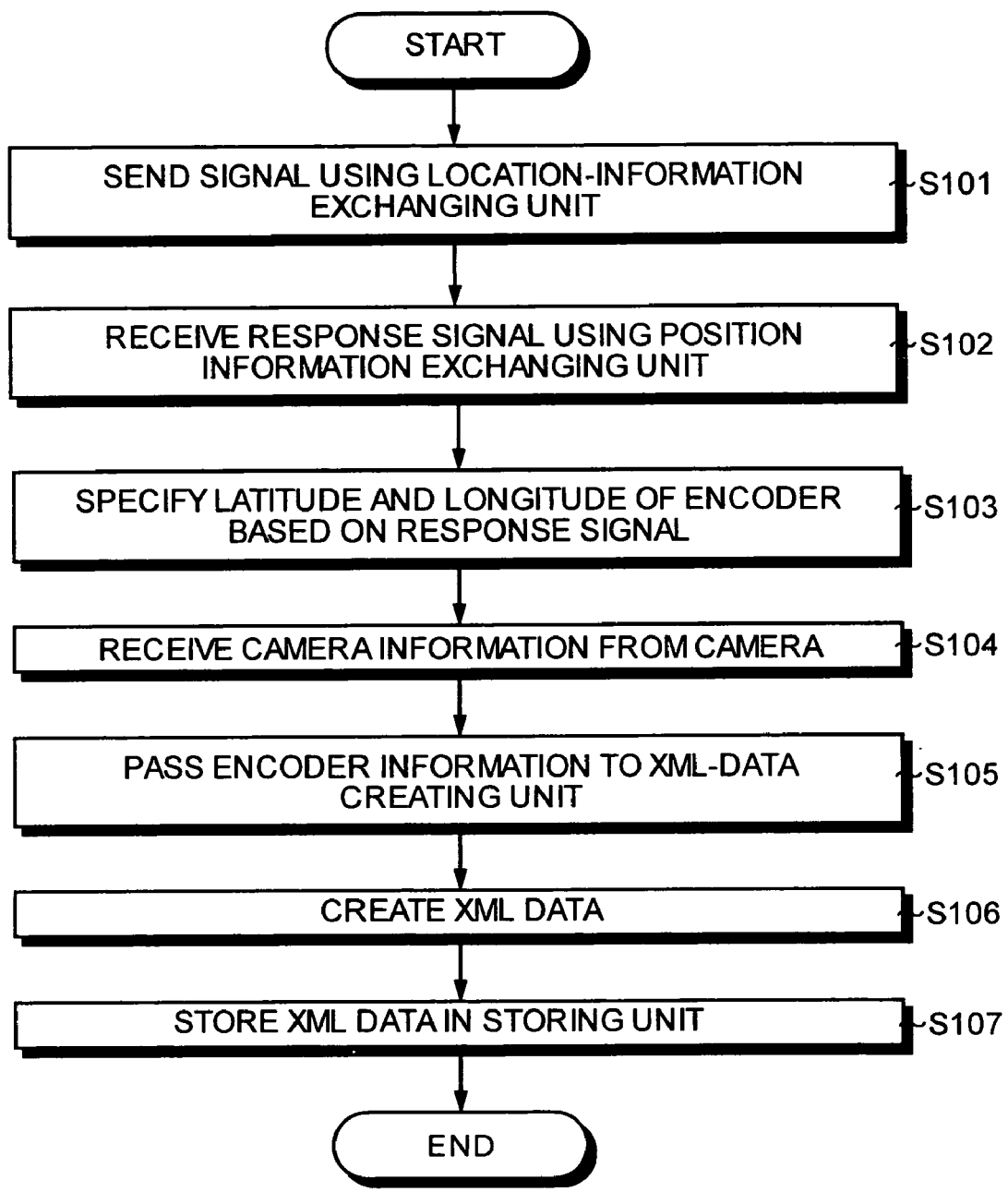

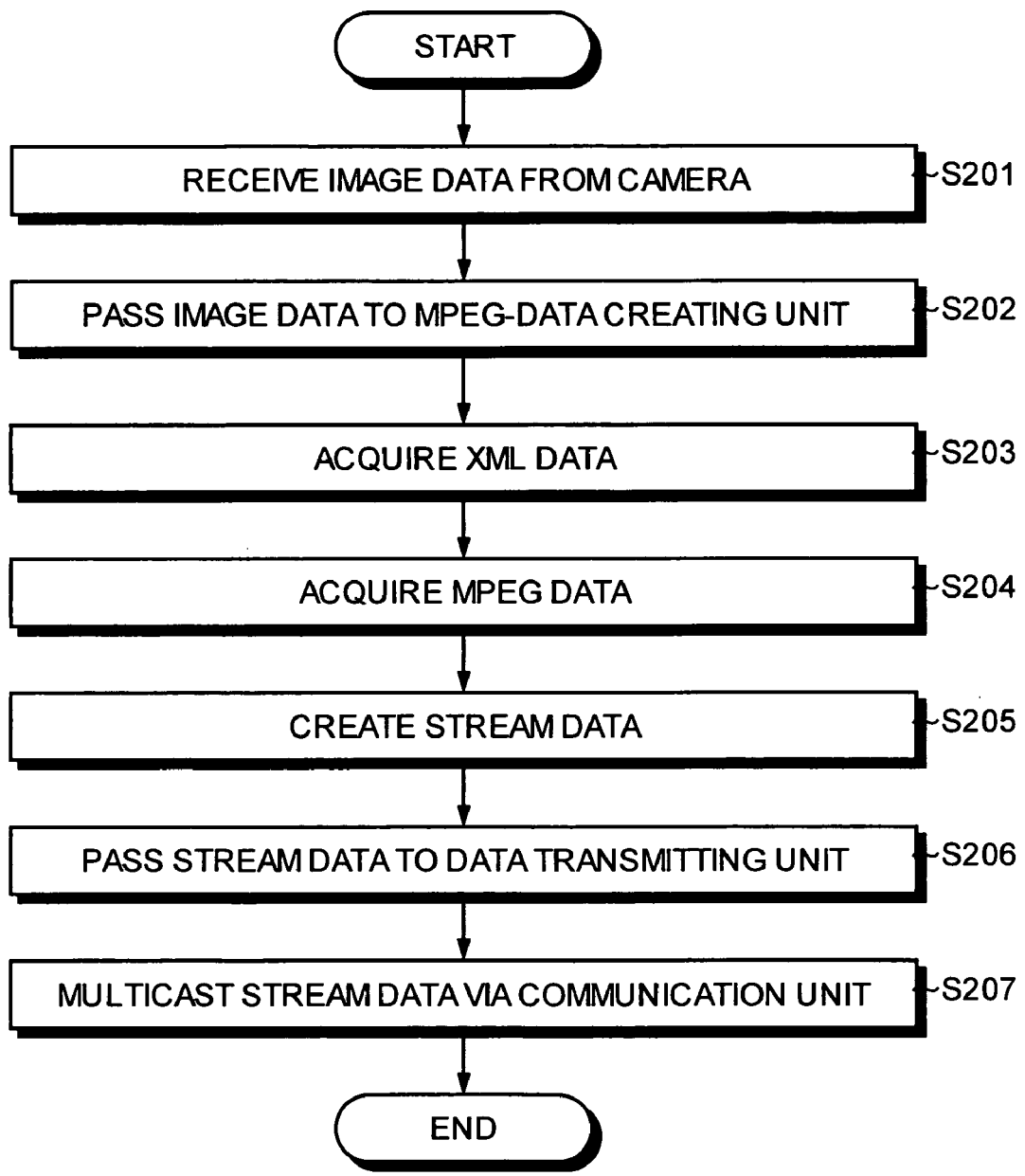

US 8,077,771 B2

MOVING-IMAGE DISTRIBUTING APPARATUS, MOVING-IMAGE DISTRIBUTING SYSTEM, AND COMPUTER PRODUCT

This application is a continuing application, filed under 35 U.S.C. §111(a), of International Application PCT/JP2003/013992, filed Oct. 31, 2003.

BACKGROUND OF THE INVENTION

1. Field of the Invention

The present invention relates to a technology for receiving moving-image data, which is an encoded moving image, from a part of a plurality of encoders that encodes captured moving images and distributing the received moving-image data to a client terminal.

2. Description of the Related Art

In a conventional moving-image distributing system, a moving-image server receives image data of MPEG4 (Moving Picture Expert Group 4) sent from an encoder, and distributes the received image data to a predetermined client terminal in a streaming form.

In this moving-image distributing system, degeneration is executed when a moving-image server has a failure. In the degeneration, a plurality of normal moving-image servers other than a failed moving-image server where a failure has occurred operates for the failed moving-image server.

A management server that manages individual moving-image servers presets presence/absence of storage setting, priority levels, and encoder IDs to individual encoders. There are three priority levels of high, medium, and low.

The management server allocates the priority according to the presence/absence of storage setting, and the ascending order of the priority levels, and IDs of encoders of which the failed moving-image server has been in charge, and assigns encoders to normal moving-image servers in the priority from a higher one. The management server forcibly stops operations of an encoder that cannot be handled by a normal moving-image server.

In a distributed processing system disclosed in Japanese Patent Application Laid-open No. H6-214962, a management node that manages a network prepares a plurality of combinations of operations and processing nodes which process the operations beforehand. When a failure occurs in a predetermined processing node, the management node selects a predetermined combination to back up operations of the failed processing node, and sends the selected combination to individual processing nodes, which back up the operations of the failed processing node based on the received combination.

However, because the priority is fixed, the conventional moving-image distributing system has a problem that the priority of the encoders cannot be changed dynamically.

For example, when a disaster or the like occurs at a location, and a fire department or the like wishes to know the situation of the disaster, an encoder that is closest to the location where the disaster has occurred and receives images of the disaster becomes important, however, the priority previously set to the encoder can be low.

That is, when an abnormality occurs in a moving-image server in charge of an encoder closest to the location where a disaster or the like has occurred, the operations of the encoder may not be assigned to a normal moving-image server and the operations may be forcibly stopped due to the low priority of the encoder.

Even when the management node allows a normal processing node to back up the operation of a failed processing node as disclosed in Japanese Patent Application Laid-open No. H6-214962, a combination of processing nodes and operations prepared beforehand is used, so that it is not possible to handle situations surrounding operations that always change.

It is therefore a very important issue to dynamically change the priority of each encoder according to the situations surrounding the encoder that changes sequentially.

SUMMARY OF THE INVENTION

It is an object of the present invention to at least solve the problems in the conventional technology.

An apparatus according to one aspect of the present invention is for receiving moving-image data from a part of a plurality of encoders that encodes captured moving image, and distributing the received moving-image data to a client terminal. The apparatus includes a moving-image-data acquiring unit that acquires, when a failure occurs in other moving-image distributing apparatus, a plurality of moving-image data transmitted from a part of the encoders to the other moving-image distributing apparatus; an imaging-target-information acquiring unit that acquires location information of an imaging target from a management server that manages the location information of the imaging target; and an encoder selecting unit that selects the encoder to take charge in place of the other moving-image distributing apparatus, based on encoder location information included in the moving-image data and the location information of the imaging target.

A moving-image distributing system according to another aspect of the present invention includes a plurality of encoders that encodes captured moving image to produce moving-image data; and a plurality of moving-image distributing apparatuses that distributes the moving-image data to a client terminal. The encoder transmits the moving-image data to the moving-image distributing apparatuses, including an encoder-information specifying unit that specifies location information of the encoder as encoder location information; and an encoder-information adding unit that adds the encoder location information to the moving-image data to be transmitted to the moving-image distributing apparatuses. Each of the moving-image distributing apparatuses includes a moving-image-data acquiring unit that acquires, when a failure occurs in other moving-image distributing apparatus, a plurality of moving-image data transmitted from a part of the encoders to the other moving-image distributing apparatus; an imaging-target-information acquiring unit that acquires location information of an imaging target from a management server that manages the location information of the imaging target; and an encoder selecting unit that selects the encoder to take charge in place of the other moving-image distributing apparatus, based on encoder location information included in the moving-image data and the location information of the imaging target.

A computer-readable recording medium according to still another aspect of the present invention stores a computer program for receiving moving-image data, which is an encoded moving image, from a part of a plurality of encoders that encodes captured moving image, and distributing the received moving-image data to a client terminal. The computer program causes a computer to execute a moving-image data acquisition procedure of acquiring, when a failure occurs in a moving-image distributing apparatus that receives the moving-image data from a part of the encoders and distributes the received moving-image data to the client terminal, a plurality of moving-image data transmitted from the part of the encoders to the moving-image distributing apparatus; an imaging-target-information acquisition procedure of acquiring location information of an imaging target from a management server that manages the location information of the imaging target; and an encoder selecting procedure of selecting the encoder to take charge in place of the moving-image distributing apparatus, based on encoder location information included in the moving-image data and the location information of the imaging target.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of a moving-image distributing system according to a first embodiment of the present invention;

FIG. 2 is a schematic for illustrating a data configuration of stream data according to the first embodiment;

FIG. 3 is an example of XML data describing location information of an encoder and information on a direction of a camera, created by an XML-data creating unit;

FIG. 4 is a flowchart of a processing procedure in which an encoder acquires location information and information on a camera direction, and creates XML data based on the acquired information;

FIG. 5 is a flowchart of a processing procedure in which an encoder creates stream data and multicasts the created stream data;

DETAILED DESCRIPTION OF THE PREFERRED EMBODIMENTS

Figure 6:
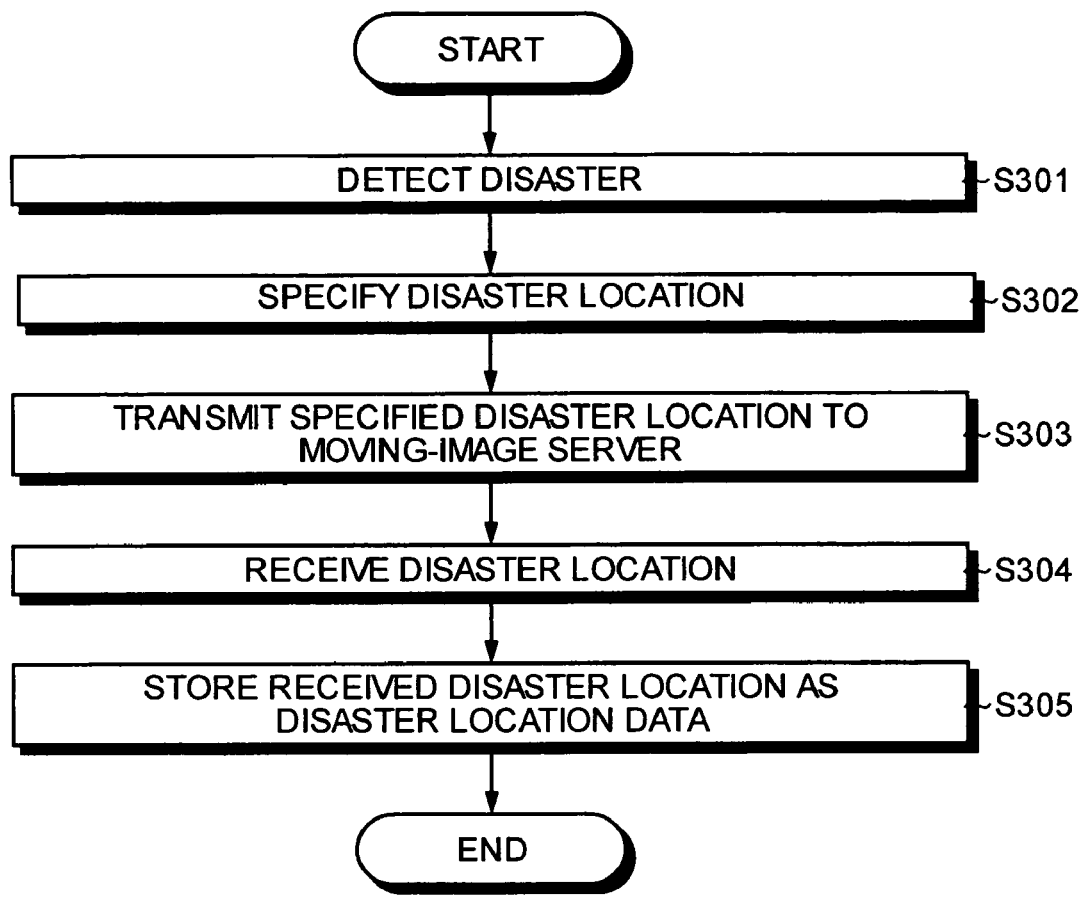
FIG. 6 is a flowchart of a processing procedure in which a disaster-information notification server detects a disaster, and transmits a detected disaster location to a moving-image server.

Exemplary embodiments of a moving-image distributing apparatus, a moving-image distributing system, and a moving-image distributing program according to the present invention will be explained below in detail with reference to the accompanying drawings. Note that the invention is not limited to the embodiments.

FIG. 1 is a block diagram of a moving-image distributing system according to a first embodiment of the present invention.

In the moving-image distributing system according to the first embodiment, encoders 10 to 12 receive image data from respective cameras 13 to 15, and multicast the received image data.

The multicasting is to designate a plurality of destinations and transmit data thereto, and multicast data is temporarily transmitted to a router 21 from which the data is transmitted to a designated one of moving-image servers 1 to 3.

Any of the moving-image servers 1 to 3 that has received the image data from the router 21 distributes the received image data to a predetermined client terminal (not shown) in a streaming form.

When a disaster is detected, a disaster-information notification server 30 connected to an Internet 40 sends a detected disaster location to the moving-image server 1, which stores the received disaster location.

When a failure occurs in either of the moving-image servers 2 and 3, the moving-image server 1 determines the priority of encoders based on information on the encoders of which the failed moving-image server has been in charge, and the disaster location received from the disaster-information notification server 30.

When the moving-image server 1 cannot take charge of all the encoders of which the failed moving-image server has been in charge, the moving-image server 1 takes charge of encoders that have a high priority by priority, and sends a stop request to those encoders of which the moving-image server 1 cannot take charge.

Since the encoders 10 to 12 have the same configuration, the encoder 10 is explained as an example. The encoder 10 receives image data from the camera 13 corresponding to the encoder 10, and adds encoder information representing information on a latitude and a longitude corresponding to the present location of the encoder 10, and information on the direction of the camera 13 currently used by the encoder 10 to MPEG data, when multicasting the received image data as stream data. Hereinafter, information on the latitude and the longitude corresponding to the present location of the encoder, and information on the direction of the camera currently used by the encoder are generally represented as encoder information.

The encoder 10 includes an input receiving unit 16, a location-information exchanging unit 17, a control unit 18, a storing unit 19, and a communication unit 20.

The input receiving unit 16 receives image data from the camera 13, and passed the received image data to the control unit 18. The control unit 18 includes an MPEG-data creating unit 18a, an XML-data creating unit 18b, a location-information processing unit 18c, and a data transmitting unit 18d.

The MPEG-data creating unit 18a creates MPEG data from image data received from the input receiving unit 16. The MPEG-data creating unit 18a acquires XML (extensible Markup Language) data 19a from the storing unit 19.

As shown in FIG. 2, the MPEG-data creating unit 18a adds a UDP (User Datagram Protocol) header 100, a RTP (Real-time Transport Protocol) header 101, and acquired XML data 102 to created MPEG data 103, and passes the data as stream data to the data transmitting unit 18d.

The XML-data creating unit 18b creates XML data including location information based on encoder information from the encoder 10 that is specified by the location-information processing unit 18c.

FIG. 3 is an example of XML data describing location information of an encoder and information on a direction of a camera, created by the XML-data creating unit 18b. In FIG. 3, "longitude="135.75"" represents the longitude of the encoder, "latitude="35.5"" represents the latitude of the encoder, "altitude="100"" represents the direction of the camera used by the encoder.

While FIG. 3 depicts a case of a fixed camera where a direction of a camera to be used is fixed, the moving range with respect to the direction of the camera is described in case of a movable camera where the direction of the camera moves.

The XML-data creating unit 18b then stores the created XML data as the XML data 19a in the storing unit 19.

The location-information processing unit 18c communicates with a base station using the location-information exchanging unit 17, and specifies the latitude and the longitude corresponding to the present location of the encoder 10. The location-information processing unit 18c receives information on the direction of the camera 13 from the camera 13.

The location-information processing unit 18c passes the location information of the encoder 10 and the information on the direction of the camera to the XML-data creating unit 18b.

The data transmitting unit 18d multicasts stream data, received from the MPEG-data creating unit 18a, via the communication unit 20. When receiving a stop request from the moving-image server 1 via the communication unit 20, the data transmitting unit 18d stops the encoder 10.

When the moving-image servers 1 to 3 receive stream data from encoders taken charge thereby, the moving-image servers 1 to 3 distribute the stream data to a predetermined client terminal in a streaming form.

When a failure occurs in the moving-image server 2 or 3, the moving-image server 1 takes charge of the encoders of which the failed moving-image server has been in charge.

However, there can be a case that the moving-image server 1 cannot take charge of all the encoders of which the failed moving-image server has been in charge.

Therefore, the moving-image server 1 sets the priority to encoders in order from the one closest to a disaster location based on location information of the encoders 10 to 12 and the disaster location sent from the disaster-information notification server 30. Based on the set priority, the moving-image server 1 sequentially selects encoders to be taken charge in place of the failed moving-image server.

When there is a plurality of encoders having the distance from the disaster location, the priority is set in further consideration of the directions of the cameras that are used by the encoders. Specifically, the encoder whose camera is directed toward the disaster location is prioritized.

The moving-image server 1 includes a communication unit 4, a control unit 5, and a storing unit 9. The control unit 5 includes a degeneration processing unit 6, a management server unit 7, and a data exchanging unit 8.

When a failure occurs in the moving-image server 2 or 3, the degeneration processing unit 6 sets the priority of the encoders of which the failed moving-image server has been in charge, and selects those encoders that will be taken charge in place thereof. The degeneration processing unit 6 has a failure sensor 6a, a take-over requesting unit 6b, and an encoder selecting unit 6c.

When a failure occurs in the moving-image server 2 or 3, the failure sensor 6a detects the failure, and specifies the failed moving-image server.

When the failure sensor 6a detects the failure, the take-over requesting unit 6b sends a take-over request to the router 21 to acquire streaming data to be multicast from the encoders of which the failed moving-image server has been in charge, based on management information 9b stored in the storing unit 9.

The encoder selecting unit 6c selects an encoder to be taken charge in place of the failed moving-image server, based on location information attached to stream data that is sent from the encoders of which the failed moving-image server has been in charge, and disaster location data 9c stored in the storing unit 9. The encoder selecting unit 6c selects the encoders in order from the one closest to the disaster location.

When there is a plurality of encoders having the same distance from the disaster location, the encoder whose camera is directed toward the disaster location is prioritized.

The management server unit 7 regularly communicates with the moving-image servers 2 and 3, and specifies the encoders of which the moving-image servers 2 and 3 take charge, and client terminals that are targets for streaming distribution. The management server unit 7 stores information on information of the encoders of which the moving-image servers take charge, and information on the client terminals in the storing unit 9 as the management information 9b.

The management server unit 7 receives information on the disaster location from the disaster-information notification server 30, and stores the received information on the disaster location in the storing unit 9 as the disaster location data 9c.

The data exchanging unit 8 receives stream data multicast from an encoder, temporarily stores the received stream data in the storing unit 9 as stream data 9a, and distributes the stored stream data 9a to a predetermined client terminal in a streaming form.

FIG. 4 is a flowchart of a processing procedure in which the encoder 10 acquires location information and information on a camera direction, and creates XML data based on the acquired information. This process is repeatedly executed while the encoder 10 is in operation. As shown in FIG. 4, the location-information processing unit 18c transmits a signal to a nearby base station using the location-information exchanging unit 17 (step S101), and receives a response signal from the base station using the location-information exchanging unit 17 (step S102).

The location-information processing unit 18c specifies the latitude and the longitude of the encoder 10 based on the received response signal (step S103). The location-information processing unit 18c receives camera information representing the direction of the camera from the camera 13 (step S104). The location-information processing unit 18c passes the latitude and the longitude of the encoder 10, and the direction of the camera 13 to the XML-data creating unit 18b as encoder information (step S105). The XML-data creating unit 18b creates XML data based on the received encoder information (step S106), and stores the created XML data in the storing unit 19 as the XML data 19a (step S107).

FIG. 5 is a flowchart of a processing procedure in which an encoder creates stream data and multicasts the created stream data.

As shown in FIG. 5, the input receiving unit 16 receives image data from the camera 13 (step S201), and passes the received image data to the MPEG-data creating unit 18a (step S202). The MPEG-data creating unit 18a acquires the XML data 19a stored in the storing unit 19 (step S203), and creates MPEG data based on the image data (step S204).

The MPEG-data creating unit 18a creates stream data that is MPEG data attached with a UDP header and a RTP header (step S205), and passes the created stream data to the data transmitting unit 18d (step S206), and the data transmitting unit 18d multicasts the stream data via the communication unit 20 (step S207).

In the encoder 10, in this manner, the location-information processing unit 18c acquires location information on the encoder beforehand, the MPEG-data creating unit 18a creates MPEG data from image data sent from the camera 13, and creates stream data that is the created MPEG data attached with the location information of encoder, and the data transmitting unit 18d multicasts the stream data via the communication unit 20.

FIG. 6 is a flowchart of a processing procedure in which the disaster-information notification server 30 detects a disaster, and transmits a detected disaster location to a moving-image server. The process of the flowchart of FIG. 6 is repeatedly executed every time the disaster-information notification server 30 detects a disaster.

As shown in FIG. 6, when a disaster occurs at a location, the disaster-information notification server 30 detects the disaster (step S301), and specifies the location where the disaster has occurred (step S302).

The disaster-information notification server 30 transmits the specified disaster location to the management server unit 7 of the moving-image server 1 (step S303), and the management server unit 7 receives the disaster location (step S), and stores the received disaster location in the storing unit 9 as the disaster location data 9c (step S305).

Figure 7:
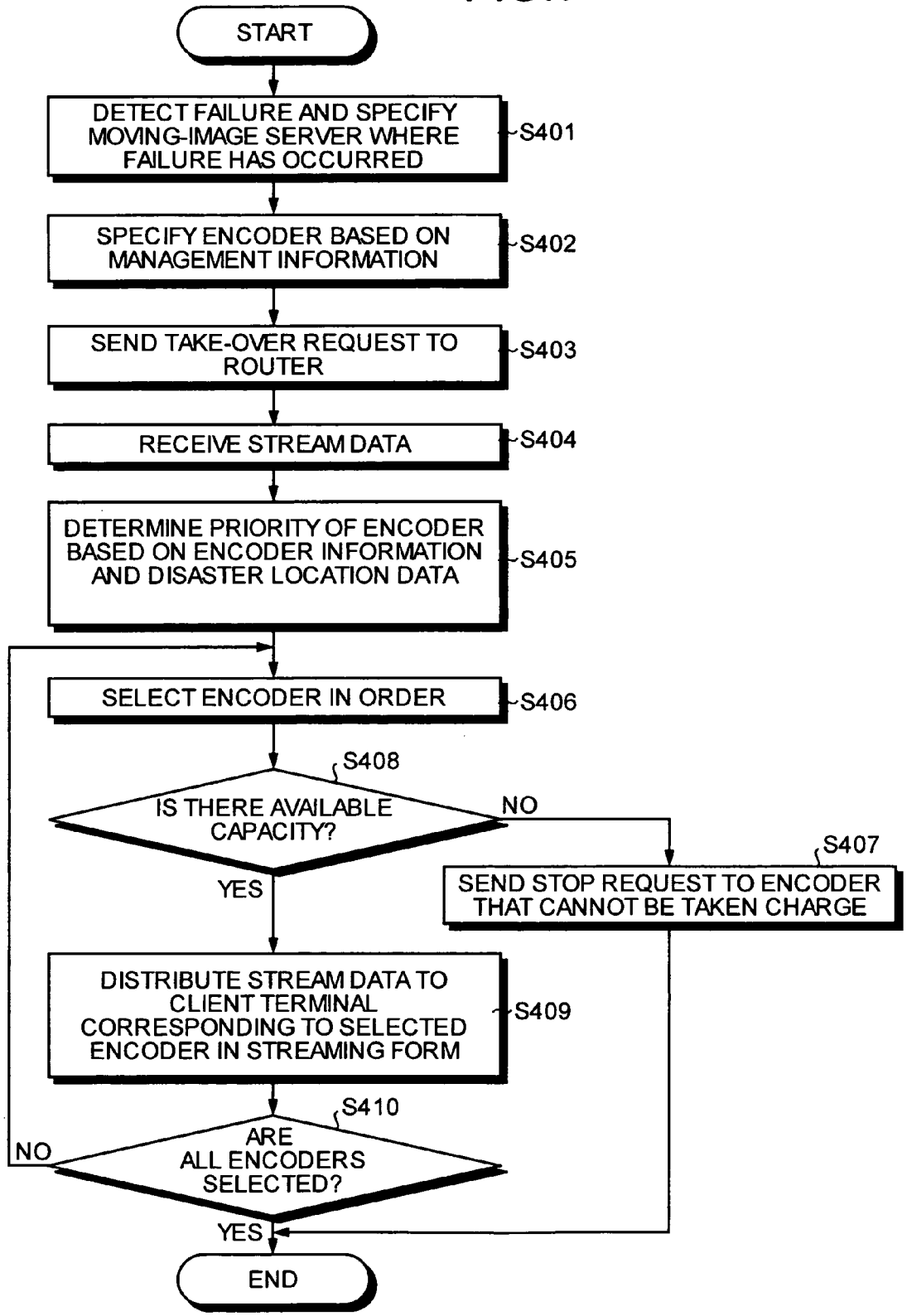
FIG. 7 is a flowchart of a processing procedure in which, when a failure occurs in a moving-image server 2 or a moving-image server 3, a moving-image server 1 determines a priority of encoders that are assigned to the failed moving-image server, and selects encoders that will take charge instead.

FIG. 7 is a flowchart of a processing procedure in which, when a failure occurs in the moving-image server 2 or the moving-image server 3, the moving-image server 1 determines a priority of encoders that are assigned to the failed moving-image server, and selects encoders that will take charge instead.

As shown in FIG. 7, the failure sensor 6a detects a failure, and specifies that moving-image server where the failure has occurred (step S401), and the take-over requesting unit 6b specifies a plurality of encoders of which the failed moving-image server takes charge, based on the server whose failure is detected, and the management information 9b (step S402).

The take-over requesting unit 6b transmits a take-over request to the router 21 to receive stream data from the specified encoders (step S403), and the encoder selecting unit 6c receives plural pieces of stream data from the router 21 (step S404).

The encoder selecting unit 6c determines the priority of the encoders in order from the one closest to the disaster location based on the location information in the XML data included in the stream data, and the disaster location data 15c (step S405). When there is a plurality of encoders having the same distance from the disaster location, the encoder for which the direction to the occurrence of a disaster is closer to the direction of the camera included in encoder information is prioritized.

The encoder selecting unit 6c selects one of the encoders in the priority from a higher one (step S406), and checks if there is a remaining storage space (step S408).

The remaining storage space is an amount remained where stream data transmitted from an encoder can be stored as the stream data 9a.

When there is no remaining storage space in the storing unit 9 (step S408, No), the encoder selecting unit 6c sends a stop request to the encoder that cannot be taken charge (step S407).

On the other hand, when there is a remaining storage space in the storing unit 9 (step S408, Yes), stream data is distributed to a client terminal corresponding to the selected encoder in a streaming form (step S409).

It is checked whether all the encoders are selected (step S410). When all the encoders are not selected (step (step S410, No), the process moves to step S406. On the other hand, when all the encoders are selected (step S410, Yes), the process is terminated.

As described above, in the streaming distribution system according to the first embodiment, the MPEG-data creating unit 18a converts image data received from a camera to MPEG data, and creates stream data having location information attached to the converted MPEG data, and the data transmitting unit 18d multicasts the stream data.

When a failure occurs in the moving-image server 2 or 3, in the moving-image server 1, the failure sensor 6a detects the failure, the take-over requesting unit 6b sends a take-over request to the router 21, and the encoder selecting unit 6c receives stream data sent from the encoders of which the failed moving-image server has been in charge.

Based on the location information included in the received stream data, and the disaster location data 15c, the encoder selecting unit 6c selects encoders to be taken charge, such that an encoder close to a disaster location is prioritized.

Accordingly, it is possible to dynamically change the priority of encoders to be taken charge in place of the failed moving-image server, according to a disaster location or the like that changes sequentially.

According to the first embodiment, the moving-image server 1 manages the moving-image server 2 or 3, and when a failure occurs in the moving-image server 2 or 3, the moving-image server 1 takes charge of the encoders of which the failed moving-image server has been in charge. However, the moving-image server 2 or 3 can likewise manage each moving-image server, and can take charge of the encoders of which the failed moving-image server has been in charge.

According to the first embodiment, the encoders are fixed but are not limited thereto. This system can be configured such that image data can be received and transmitted to a predetermined moving-image server using a mobile terminal, such as a cell phone with a camera.

Second Embodiment

Figure 8:
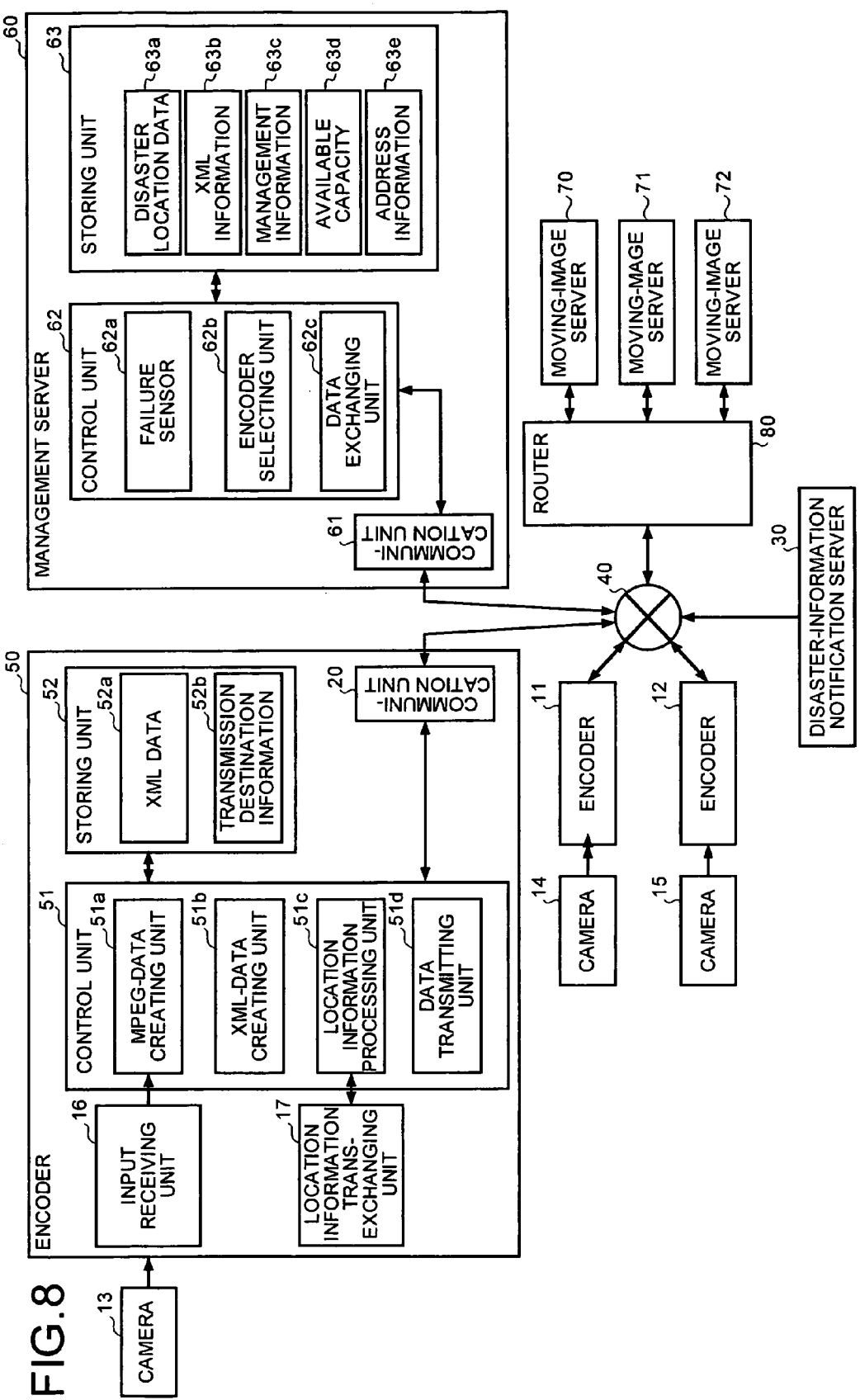
FIG. 8 is a block diagram of a moving-image distributing system according to a second embodiment of the present invention.

FIG. 8 is a block diagram of the moving-image distributing system according to a second embodiment of the present invention.

As shown in FIG. 8, in the moving-image distributing system according to the second embodiment, encoders 50, 11, 12 receive image data from respective cameras 13 to 15, and transmit the received image data to a designated one of moving-image servers 70 to 72. The moving-image server that has received the image data distributes the received image data to a predetermined client terminal in a streaming form.

At the time, the encoders 50, 11, 12 designate a moving-image server as a destination, based on MDO6 (Multiple Destination Option on IPv6), and sends the data.

Figure 9:
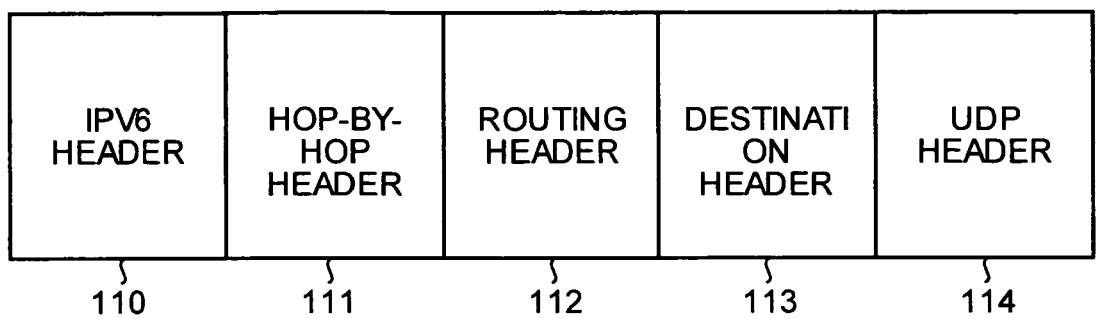
FIG. 9 is a schematic for illustrating an extension header based on MDO6.

According to the MDO6, as shown in FIG. 9, a destination address is explicitly stored as an extension header of IPv6. As shown in FIG. 9, the extension header includes an IPV6 (Internet Protocol version 6) header 110, a Hop-by-Hop header 111, a Routing header 112, a Destination header 113, and a UDP (User Datagram Protocol) header 114, and particularly, addresses for a plurality of moving-image servers as the transmission destinations are designated in the Destination header 113 according to the MDO6.

At the time of sending image data, the encoders 50, 11, 12 convert the image data to MPEG data, add the basic header of the IPV6 and an extension header based on the MDO6 to the converted MPEG data, and send the data to a router 80.

The router 80 sends the received data to a predetermined moving-image server designated by the extension header.

When a failure occurs in any one of the moving-image servers 70 to 72, a management server 60 selects a normal moving-image server that takes place of the failed moving-image server.

The management server 60 selects the moving-image server 71 when a failure occurs in the moving-image server 70, selects the moving-image server 72 when a failure occurs in the moving-image server 71, and selects the moving-image server 70 when a failure occurs in the moving-image server 72.

The management server 60 determines the priority of a plurality of encoders that send image data to the failed moving-image server, and the encoders send the address information of the moving-image server that takes in charge from an encoder having a higher priority.

For a moving-image server whose available capacity exceeds the available capacity of a normal moving-image server for image data and which cannot take charge of encoders, the management server 60 sends a stop request to the encoders of which cannot be taken charge.

The management server 60 determines the priority of encoders, based on information on the disaster location sent from the disaster-information notification server 30, and location information of the encoders sent from the encoders 50, 11, 12.

Since the encoders 50, 11, 12 have the same configuration, the encoder 50 is explained as an example. The encoder 50 receives image data from the camera 13, and creates MPEG data based on the received image data.

To send the created MPEG data to a plurality of designated moving-image servers, the encoder 50 adds the extension header designating the addresses of the moving-image servers, and the basic header of the IPv6 to the MPEG data based on the MDO6, and sends the data as stream data to the router 80. The sent data is transmitted to the designated moving-image servers from the router 80.

The encoder 50 specifies location information or the like of the encoder 50, creates XML data based on the specified information, and sends the created XML data to the management server 60.

The encoder 50 includes a control unit 51 and a storing unit 52. Since other configurations and operations are the same as those of the encoder 10 according to the first embodiment, like reference numerals are designated to like constituent elements, to omit the explanation.

The control unit 51 includes an MPEG-data creating unit 51a, an XML-data creating unit 51b, a location-information processing unit 51c, and a data exchanging unit 51d.

The MPEG-data creating unit 51a receives image data from the input receiving unit 16, and creates MPEG data from the received image data. The MPEG-data creating unit 51a creates an extension header designating a plurality of addresses based on transmission destination information 52b and the MDO6. The transmission destination information 52b represents addresses of a plurality of moving-image servers that are transmitted by the encoder 50.

The MPEG-data creating unit 51a attaches the basic header of the IPv6 and the extension header to the MPEG data, and passes the data as stream data to the data exchanging unit 51d.

The XML-data creating unit 51b creates XML data based on location information of the encoder received from the location-information processing unit 51c, and stores the created XML data as XML data 52a in the storing unit 52.

The location-information processing unit 51c communicates with a base station using the location-information exchanging unit 17, and specifies the latitude and the longitude of the present location of the encoder 50. The location-information processing unit 51c receives camera information representing the direction of the camera 13 from the camera 13. The location-information processing unit 51c passes the information on the latitude and the longitude of the specified present location, and information on the direction of the camera 13 to the XML-data creating unit 51b as encoder information.

The data exchanging unit 51d transmits the stream data received from the MPEG-data creating unit 51a to the designated moving-image servers via the communication unit 20. The data exchanging unit 51d regularly transmits the XML data 52a to the management server 60.

When a failure occurs in the moving-image server to which image data is to be transmitted, the data exchanging unit 51d receives address information of a normal moving-image server that operates for the failed moving-image server from the management server 60, and corrects the transmission destination information 52b based on the received address information.

If the data exchanging unit 51d receives a stop request from the management server 60 when a failure occurs in the moving-image server to which image data is to be transmitted, the data exchanging unit 51d stops the encoder 50.

When a failure occurs in the moving-image servers 70 to 72, the management server 60 selects a normal moving-image server that takes charge of the encoders of which the failed moving-image server has been in charge. The management server 60 transmits address information of the newly selected moving-image server to the encoders that transmit stream data to the failed moving-image server.

The management server 60 regularly receives XML data from the encoders 50, 11, 12, and stores the received XML data in association with the encoders. The XML data includes encoder location information of the encoders 50, 11, 12.

The management server 60 has a communication unit 61, a control unit 62, and a storing unit 63. The communication unit 61 is a network interface that performs data communication with the encoders 50, 11, 12, the disaster-information notification server 30, and the moving-image servers 70 to 72.

The control unit 62 has a failure sensor 62a, an encoder selecting unit 62b, and a data exchanging unit 62c.

The failure sensor 62a detects a failure occurring in any one of the moving-image servers 70 to 72.

When a failure occurs in any one of the moving-image servers 70 to 72, the encoder selecting unit 62b first specifies the encoder that is transmitting stream data to the failed moving-image server based on management information 63c.

Based on the location information of the specified encoder and disaster location data 63a received from the disaster-information notification server 30, the encoder selecting unit 62b specifies the priority such that an encoder close to the disaster location is prioritized.

When there is a plurality of encoders whose distances to the disaster location are equal, the encoder for which the direction to the occurrence of a disaster from the location of the encoder is closer to the direction of the camera included in encoder information is prioritized.

The encoder selecting unit 62b selects an encoder based on the determined priority of the encoders and available capacity 63d of the moving-image server that takes charge. The available capacity 63d represents the remaining capacity for stream data that can be stored in the moving-image server that operates for the failed moving-image server.

Therefore, the encoder selecting unit 62b determines whether the capacity exceeds the available capacity of a server that takes charge every time an encoder is selected, and transmits address information 63e of the moving-image server that takes charge of the selected encoder when the capacity does not exceed the available capacity.

On the other hand, when the capacity exceeds the available capacity of the moving-image server in charge at the time an encoder is selected, a stop request is sent to the remaining encoders that are not selected.

The data exchanging unit 62c receives disaster location data indicating the disaster location transmitted from the disaster-information notification server 30, XML data transmitted from the encoders 50, 11, 12, information specifying the encoders of which the moving-image servers 70 to 72 are currently in charge, transmitted from the moving-image servers 70 to 72, information on the capacities of the moving-image servers 70 to 72 that can store image data, and address information of the moving-image servers 70 to 72.

The data exchanging unit 62c stores the received disaster location data, XML data, encoder specifying information, information on available capacity, and address information in the storing unit 63 as the disaster location data 63a, XML information 63b, the management information 63c, the available capacity 63d and the address information 63e.

Figure 10:
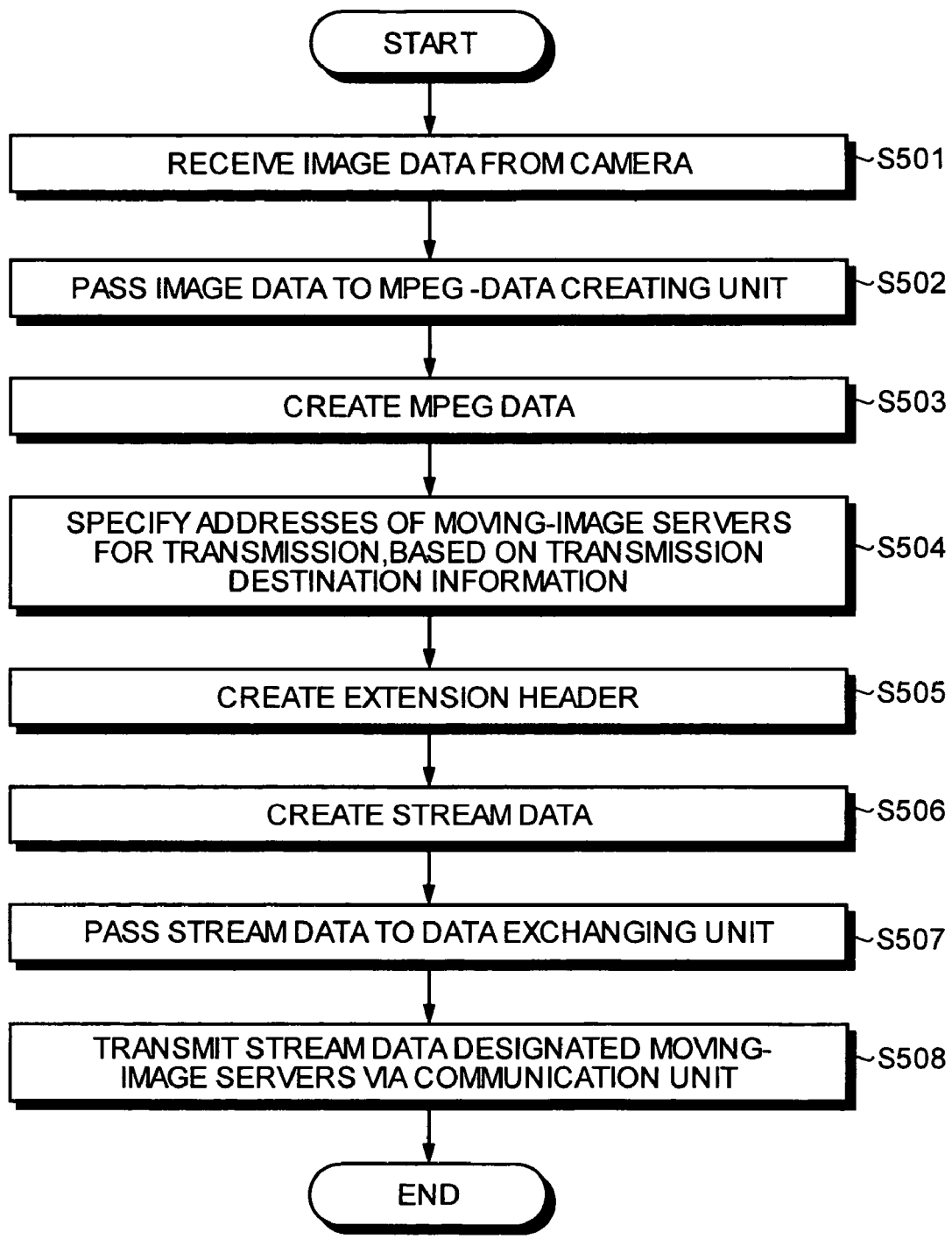
FIG. 10 is a flowchart of a processing procedure in which an encoder transmits stream data to a designated moving-image server.

FIG. 10 is a flowchart of a processing procedure in which the encoder transmits stream data to a designated moving-image server.

As shown in FIG. 10, the input receiving unit 16 receives image data from the camera 13 (step S501), and passes the received image data to the XML-data creating unit 51b (step S502).

The MPEG-data creating unit 51a creates MPEG data from the acquired image data (step S503), specifies the addresses of a plurality of moving-image servers to which transmission is made, based on the transmission destination information 52b (step S504), and creates an extension header designating the addresses of predetermined moving-image servers from the specified addresses of the moving-image servers (step S505).

The MPEG-data creating unit 51a creates stream data that is the created MPEG data to which the basic header of the IPv6 and the extension header are attached (step S506), and passes the created stream data to the data exchanging unit 51d (step S507), and the data exchanging unit 51d transmits the stream data to designated moving-image servers via the communication unit 20 (step S508).

In this manner, in the encoder 50, the MPEG-data creating unit 51a creates MPEG data from image data sent from the camera 13, creates an extension header including a plurality of addresses based on the transmission destination information 52b, and transmits stream data that is the MPEG data to which the basic header of the IPv6 and the extension header are attached to designated moving-image servers.

Figure 11:
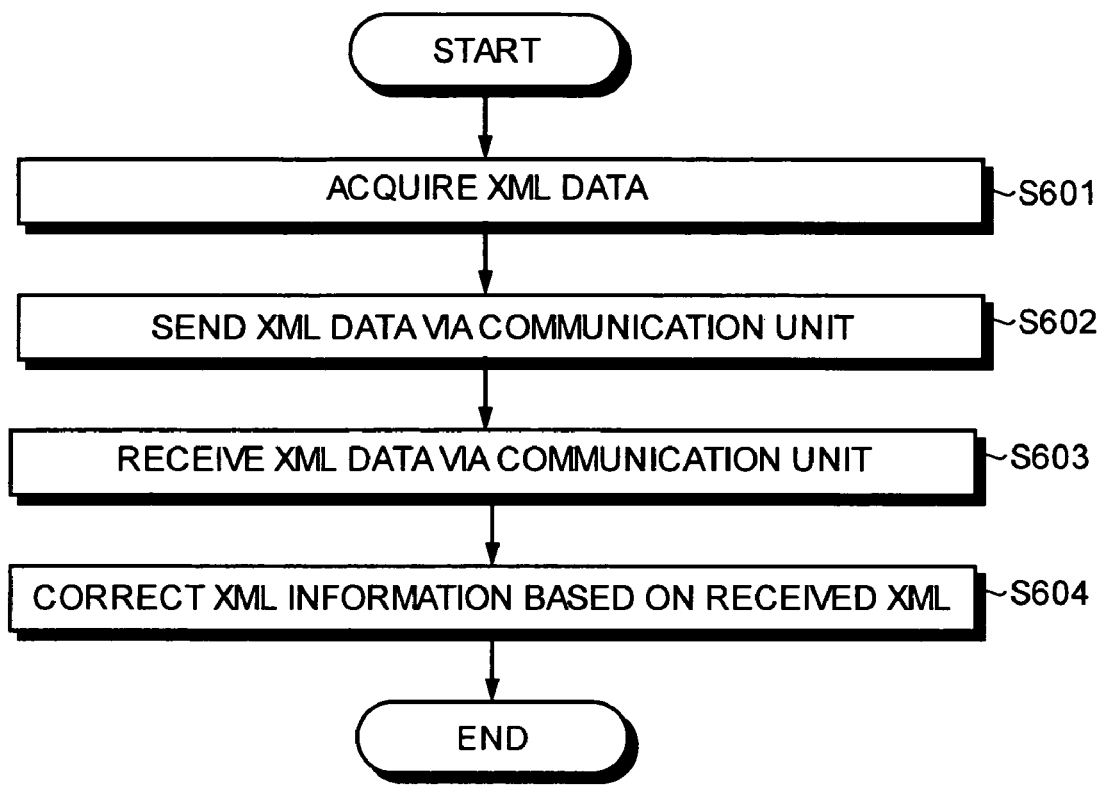
FIG. 11 is a flowchart of a processing procedure in which an encoder transmits XML data including location information to a management server.

FIG. 11 is a flowchart of a processing procedure in which the encoder transmits XML data including location information to the management server 60.

As shown in FIG. 11, the data exchanging unit 51d acquires the XML data 52a from the storing unit 52 (step S601), and sends the acquired XML data to the data exchanging unit 62c via the communication unit 20 (step S602).

The data exchanging unit 62c receives the XML data via the communication unit 61 (step S603), and corrects the XML information 63b based on the received XML data (step S604).

Figure 12:
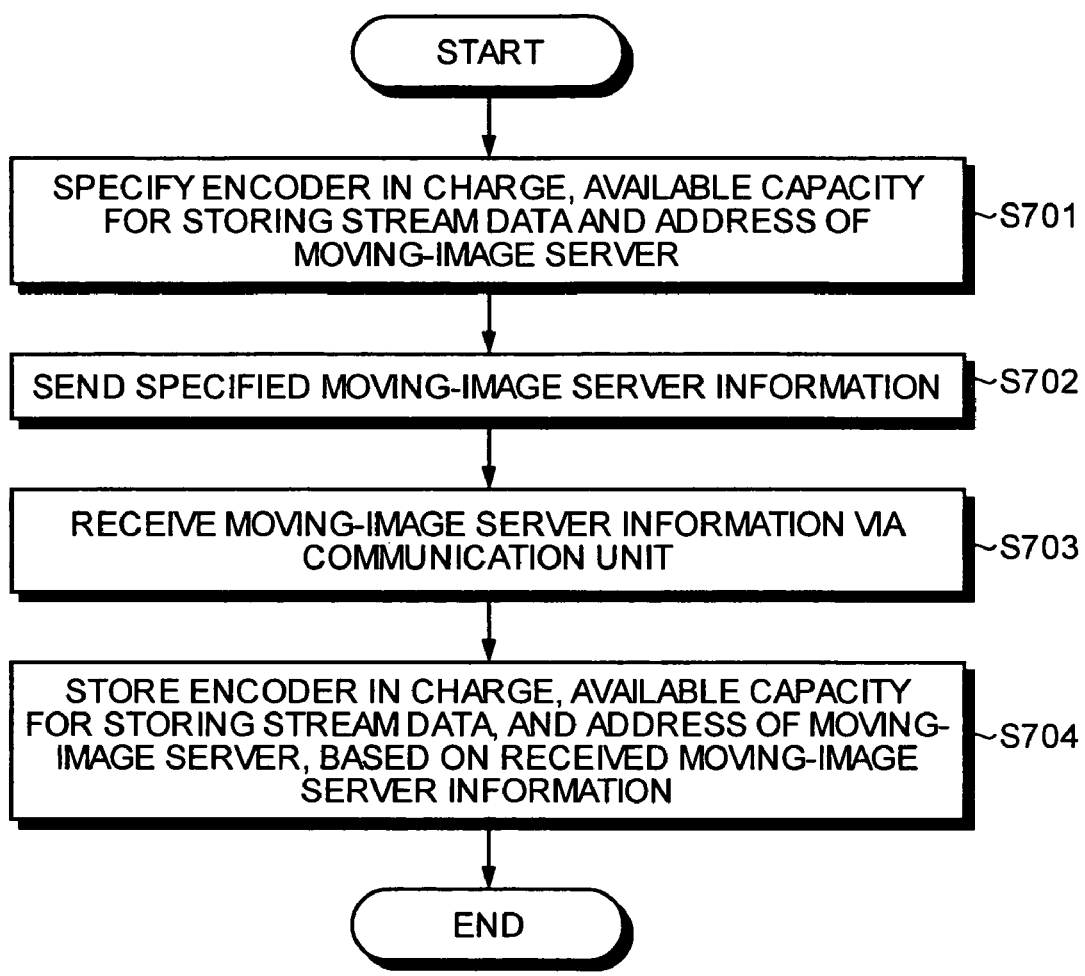
FIG. 12 is a flowchart of a processing procedure in which encoders that are currently assigned to a moving-image server, available capacity for storing image data, and address information of the moving-image server are transmitted to a management server.

FIG. 12 is a flowchart of a processing procedure in which the encoders that are currently assigned to the moving-image server, available capacity for storing image data, and address information of the moving-image server are transmitted to the management server.

As shown in FIG. 12, the encoders of which the moving-image server 70 is currently in charge, the available capacity for storing stream data, and address information of the moving-image server 70 are specified as moving-image server information (step S701), and the specified moving-image server information is sent to the data exchanging unit 62c (step S702).

The data exchanging unit 62c receives the moving-image server information via the communication unit 61 (step S703), and stores individual pieces as the management information 63c, the available capacity 63d and the address information 63e in the storing unit 63 based on the received moving-image server information (step S704). The management information 63c indicates the encoders of which the moving-image server is currently in charge, the available capacity 63d represents the available capacity for storing stream data of the moving-image server, and the address information 63e represents the address of the moving-image server.

The moving-image servers 71 and 72 likewise transmit moving-image server information to the management server 60. Therefore, the management information 63c includes information on the encoders of which each of the moving-image servers 70 to 72 is in charge, the available capacity 63d includes information on available capacity for storing stream data of each of the moving-image servers 70 to 72, and the address information 63e includes the address information of the moving-image servers 70 to 72.

Figure 13:
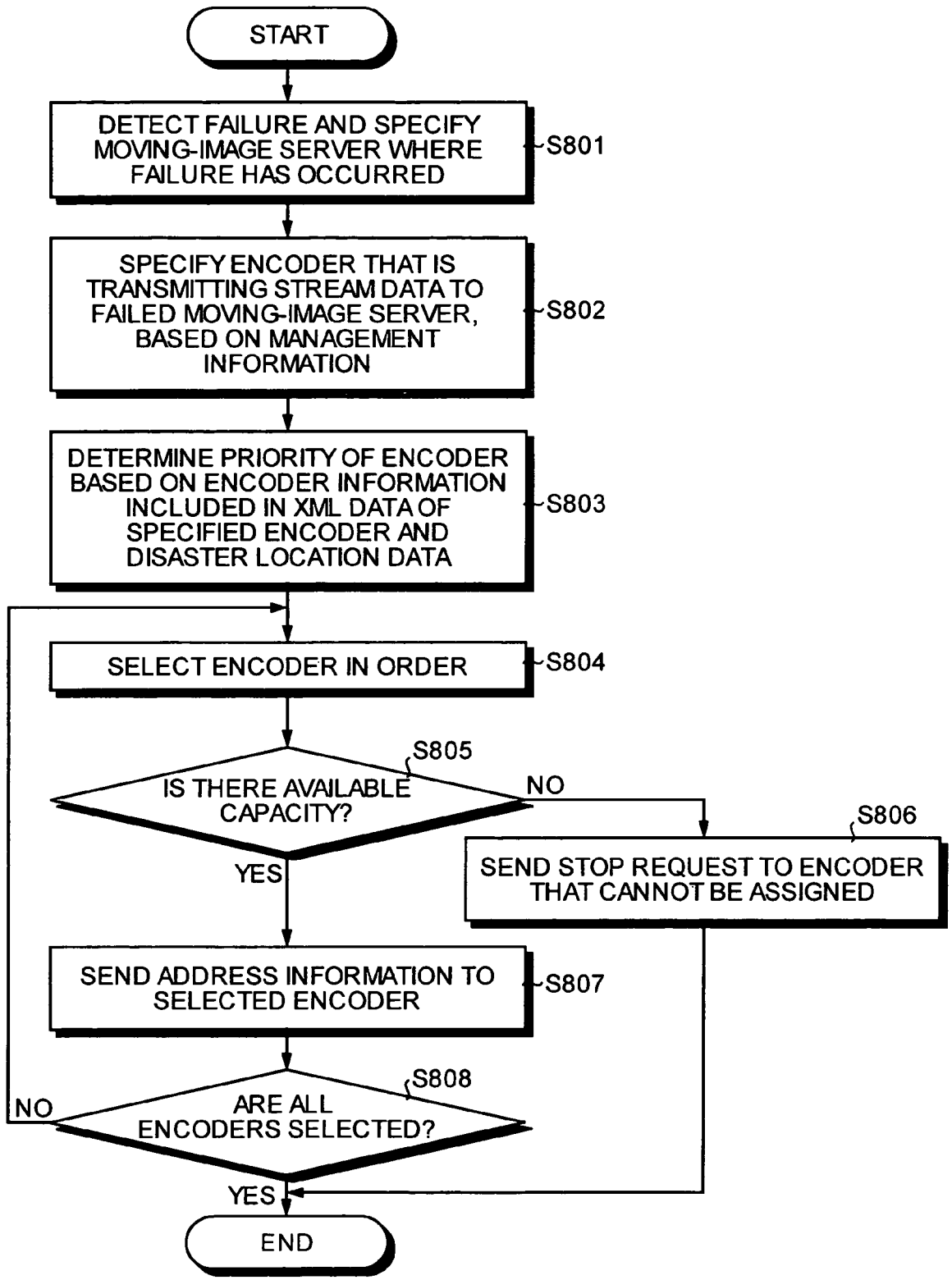
FIG. 13 is a flowchart of a processing procedure in which a management server detects a failure in a moving-image server, and gives an instruction such that an encoder can transmit stream data to a normal moving-image server.

FIG. 13 is a flowchart of a processing procedure in which the management server detects a failure in a moving-image server, and gives an instruction such that an encoder can transmit stream data to a normal moving-image server.

As shown in FIG. 13, the failure sensor 62a detects a failure, and specifies a moving-image server where the failure has occurred (step S801). The encoder selecting unit 62b specifies a plurality of encoders that are transmitting stream data to the failed moving-image server based on the management information 63c (step S802), and determines the priority based on location information of a plurality of encoders included in the XML information 63 and the disaster location data 63a, such that an encoder close to the disaster location is prioritized (step S803).

When there is a plurality of encoders having the same distance from the disaster location at step S803, the encoder for which the direction to a disaster location is closer to the direction of the camera is prioritized.

The encoder selecting unit 62b selects one of the encoders in order (step S804), and determines based on the available capacity 63d whether the moving-image server that operates for the failed moving-image server has space to store stream data (step S805).

When there is not space to store stream data (step S805, No), the encoder selecting unit 62b sends a stop request to the encoder that cannot be assigned to a normal moving-image server (step S806).

On the other hand, when there is space to store stream data (step S805, Yes), the encoder selecting unit 62b acquires the address of a moving-image server to be a new transmission destination from the address information 63e, sends the acquired address to the selected encoder (step S807), and checks if all the encoders are selected (step S808).

When all the encoders are not selected (step S808, No), the process moves to step S804. When all the encoders are selected (step S808, Yes), the process is terminated.

In the streaming distribution system according to the second embodiment, when a failure occurs in the moving-image servers 70 and 71, the encoder selecting unit 62b determines the priority of the encoder that is transmitting stream data to the moving-image server where the failure occurs, based on the disaster location data 63a and the XML information 63b, sends the address information of normal moving-image servers to the encoders in order from one having a higher priority, and the encoder that has received the address information changes the address of the moving-image server to be a transmission destination.

When a failure occurs in a moving-image server, therefore, it is possible to dynamically change the priority of the encoder that transmits stream data to the moving-image server where the failure occurs according to the situation of a disaster or the like which changes sequentially, and send optimal stream data to a client terminal.

According to the second embodiment, when a failure occurs in the moving-image server 70, the moving-image server 71 operates instead, when a failure occurs in the moving-image server 71, the moving-image server 72 operates instead, and when a failure occurs in the moving-image server 72, the moving-image server 70 operates instead. However, the configuration can be taken such that, for example, when a failure occurs in the moving-image server 70, the moving-image servers 71 and 72 operate instead, when a failure occurs in the moving-image server 71, the moving-image servers 72 and 70 operate instead, and when a failure occurs in the moving-image server 72, the moving-image servers 70 and 71 operate instead.

While location information of an encoder and information on a direction of a camera used by the encoder are described by using XML in the first and the second embodiments, location information of an encoder, and information on a direction of a camera used by the encoder can be described by using other languages, and attached to MPEG data.

While the moving-image distributing system has been explained in the first and the second embodiments, a moving-image distributing program that has similar functions can be acquired by realizing the configuration of the moving-image servers according to the moving-image distributing system by software.

Figure 14:
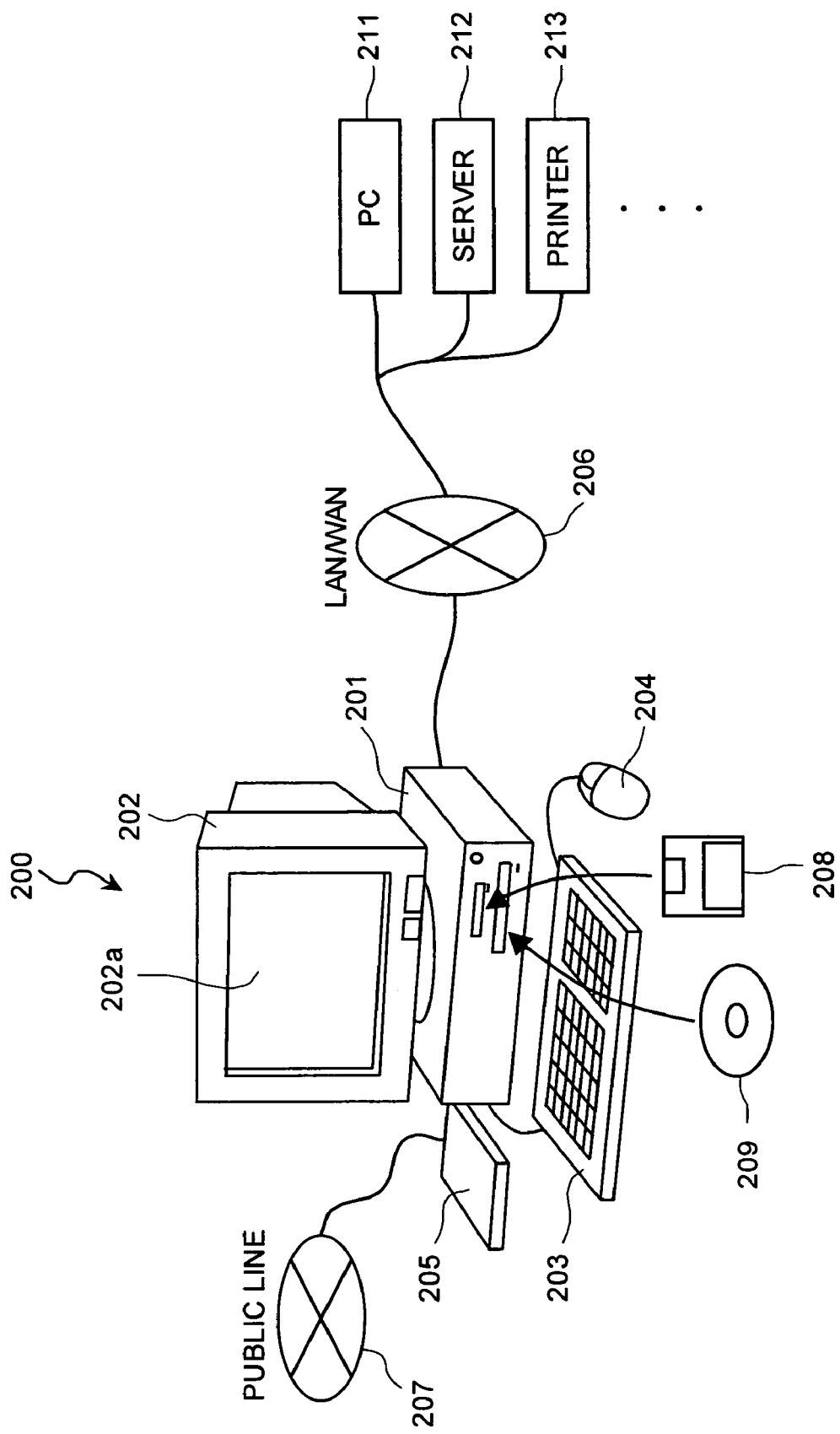
FIG. 14 is a schematic of a computer system that executes a moving-image distributing program according to the first and the second embodiments.

FIG. 14 is a schematic of a computer system that executes a moving-image distributing program according to the first and the second embodiments. As shown in FIG. 14, a computer system 200 includes a main unit 201, a display 202 that displays information on a display screen 202a in response to instructions from the main unit 201, a keyboard 203 for inputting various kinds of information to the computer system 200, a mouse 204 that designates an arbitrary location on the display screen 202a of the display 202, a local-area-network (LAN) interface that connects to a LAN/wide area network (WAN) 206, and a modem 205 that connects to a public line 207. The LAN 206 connects another computer system (PC) 211, a server 212, a printer 213, or the like, to the computer system 200.

Figure 15:
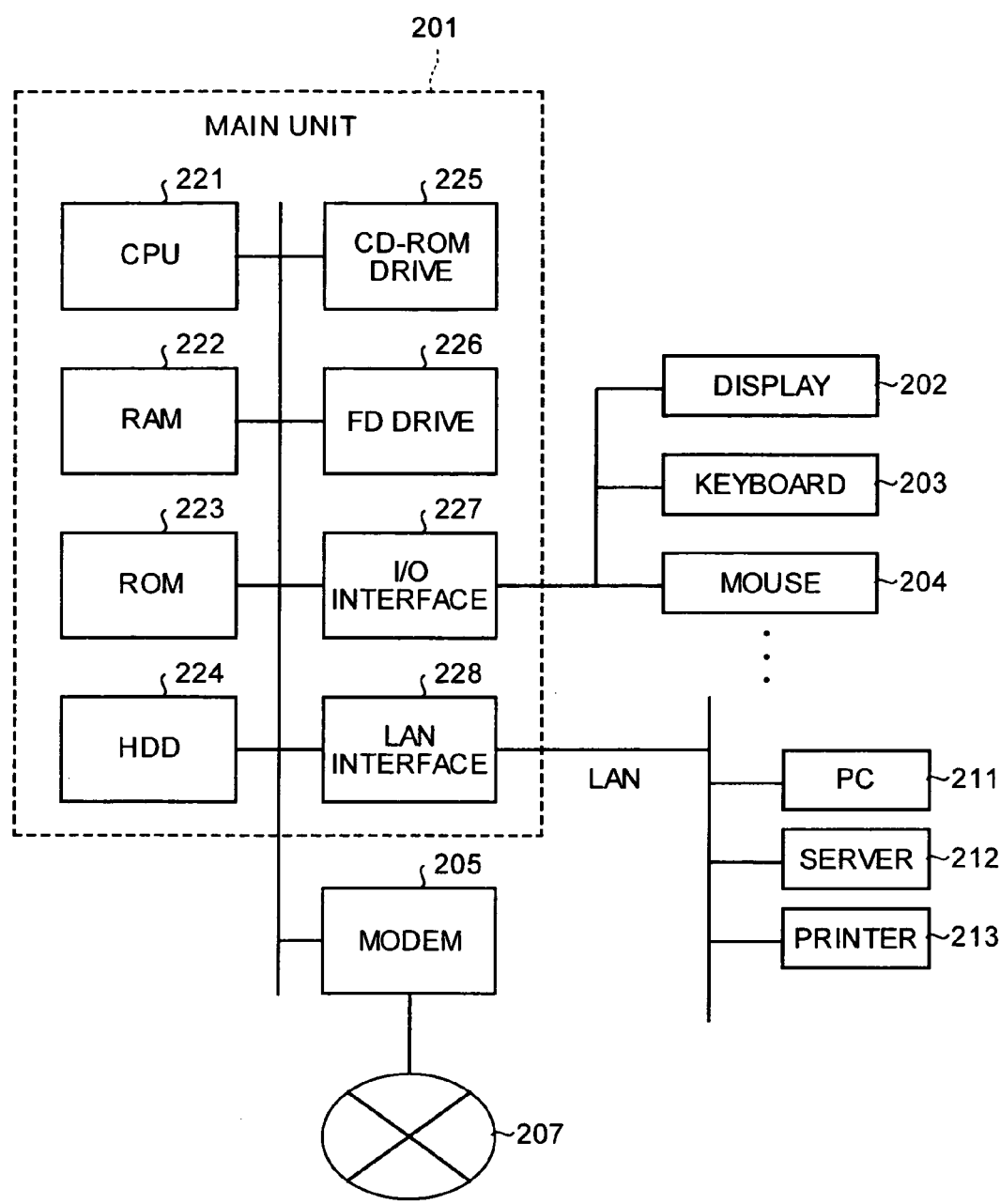
FIG. 15 is a block diagram of a configuration of a main unit shown in FIG. 14.

FIG. 15 is a block diagram of the main unit 201 shown in FIG. 14. As shown in FIG. 15, the main unit 201 includes a central processing unit (CPU) 221, a random access memory (RAM) 222, a read only memory (ROM) 223, a hard disk drive (HDD) 224, a compact disk-read only memory (CD-ROM) drive 225, a flexible disk drive (FDD) 226, an input/output (I/O) interface 227, and a LAN interface 228.

The moving-image distributing program that is executed by the computer system 200 is stored in a portable storage medium, such as a flexible disk (FD) 208, a CD-ROM 209, a digital versatile disk (DVD), a magneto-optical (MO) disk, or an integrated-circuit (IC) card, and is read from the storage medium and is installed in the computer system 200.

The installed moving-image distributing program is stored in the HDD 224, and is executed by the CPU 221 using the RAM 222, the ROM 223 or the like.

As described above, according to the present invention, an encoder specifies location information where the encoder is located, adds the specified location information to encoded moving-image data, and transmits the data to the moving-image distributing apparatus. When a failure occurs in another moving-image distributing apparatus, the moving-image distributing apparatus acquires moving-image data of a plurality of encoders that are transmitting the moving-image data to the another moving-image distributing apparatus, selects an encoder close to the disaster location by priority based on location information of the encoders included in the acquired plural pieces of moving image and the disaster location, and takes charge of the selected encoder in place of the another moving-image distributing apparatus that has a failure. This brings about an effect that the priority of the encoder can be dynamically changed according to situations surrounding the encoder, and important moving-image data can be stably distributed to a client terminal.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A moving-image distributing apparatus for receiving moving-image data from a plurality of encoders that encodes captured moving image, and distributing the received moving-image data to a client terminal, the apparatus comprising:
a moving-image-data acquiring unit that acquires, when a failure occurs in a further moving-image distributing apparatus other than the moving-image distributing apparatus, a plurality of moving-image data transmitted from the plurality of encoders to the further moving-image distributing apparatus;
an imaging-target-information acquiring unit that acquires location information about an imaging target from a management server that manages the location information about the imaging target;
a determining unit that determines an order of priority of encoders such that a priority of an encoder being closer to a location of the imaging target is higher than that of other encoders, based on the location information about the imaging target acquired and encoder location information about the plurality of encoders included in the moving-image data; and
an encoder selecting unit that selects an encoder to take charge in place of the further moving-image distributing apparatus, based on the order of priority of encoders determined by the determining unit.

2. The moving-image distributing apparatus according to claim 1, wherein
the location information about the imaging target includes at least information on a disaster location where a disaster has occurred, and
the encoder selecting unit selects an encoder close to the disaster location by priority, based on the information on the disaster location and the encoder location information.

3. The moving-image distributing apparatus according to claim 2, wherein
the moving-image data further includes information on a direction of a camera that is used by the encoder, and
the encoder selecting unit selects, when there is a plurality of encoders having same distance from the disaster location, the encoder in further consideration of the information on the direction of the camera.

4. A moving-image distributing system comprising:
a plurality of encoders that encodes captured moving image to produce moving-image data; and
a plurality of moving-image distributing apparatuses that distributes the moving-image data to a client terminal, wherein
the encoder transmits the moving-image data to the moving-image distributing apparatuses, including
an encoder-information specifying unit that specifies location information about the encoder as encoder location information; and
an encoder-information adding unit that adds the encoder location information to the moving-image data to be transmitted to the moving-image distributing apparatuses, and
each of the moving-image distributing apparatuses comprises a memory coupled to a processor, wherein the processor includes
a moving-image-data acquiring unit that acquires, when a failure occurs in a further moving-image distributing apparatus other than the moving-image distributing apparatus, a plurality of moving-image data transmitted from a plurality of the encoders to the further moving-image distributing apparatus;
an imaging-target-information acquiring unit that acquires location information about an imaging target from a management server that manages the location information about the imaging target;
a determining unit that determines an order of priority of encoders such that a priority of an encoder being closer to a location of the imaging target is higher than that of other encoders, based on the location information about the imaging target acquired and the encoder location information about the plurality of encoders included in the moving-image data; and
an encoder selecting unit that selects an encoder to take charge in place of the further moving-image distributing apparatus, based on the order of priority of encoders determined by the determining unit.

5. The moving-image distributing system according to claim 4, wherein
the location information of the imaging target includes at least information on a disaster location where a disaster has occurred, and
the encoder selecting unit selects an encoder close to the disaster location by priority, based on the information on the disaster location and the encoder location information.

6. The moving-image distributing system according to claim 5, wherein
the encoder-information specifying unit further specifies information on a direction of a camera that is used by the encoder,
the encoder-information adding unit further adds the information on the direction of the camera to the moving-image data to be transmitted to the moving-image distributing apparatuses, and
the encoder selecting unit selects, when there is a plurality of encoders having same distance from the disaster location, the encoder in further consideration of the information on the direction of the camera.

7. The moving-image distributing system according to claim 4, wherein
the encoder further includes a moving-image-distribution-apparatus designating unit that designates the moving-image distributing apparatuses to be transmission destinations of the moving-image data, based on an external instruction.

8. A computer-readable recording medium that stores a computer program for receiving moving-image data, which is an encoded moving image, from a plurality of encoders that encodes captured moving image, and distributing the received moving-image data to a client terminal, wherein
the computer program causes a computer to execute a process comprising:
acquiring, when a failure occurs in a moving-image distributing apparatus that receives the moving-image data from the plurality of the encoders and distributes the received moving-image data to the client terminal, a plurality of moving-image data transmitted from the plurality of the encoders to the moving-image distributing apparatus;
acquiring location information about an imaging target from a management server that manages the location information about the imaging target;
determining an order of priority of encoders such that a priority of an encoder being closer to a location of the imaging target is higher than that of other encoders, based on the location information about the imaging target acquired and encoder location information about the plurality of encoders included in the moving-image data; and
selecting an encoder to take charge in place of the further moving-image distributing apparatus, based on the order of priority of encoders determined at the determining.

9. The computer-readable recording medium according to claim 8, wherein
the location information about the imaging target includes at least information on a disaster location where a disaster has occurred, and
the selecting includes selecting an encoder close to the disaster location by priority, based on the information on the disaster location and the encoder location information.

10. The computer-readable recording medium according to claim 9, wherein
the moving-image data further includes information on a direction of a camera that is used by the encoder, and
the selecting includes selecting, when there is a plurality of encoders having same distance from the disaster location, the encoder in further consideration of the information on the direction of the camera.

* * * * *